(12) United States Patent
Upchurch et al.

(10) Patent No.: US 9,180,889 B2
(45) Date of Patent: Nov. 10, 2015

(54) AUTOMATIC IMPLEMENT IDENTIFICATION SYSTEM

(71) Applicant: DEERE & COMPANY, Moline, IL (US)

(72) Inventors: Bruce L. Upchurch, Waterloo, IA (US); Karl Pfeil, Darmstadt (DE); Andreas Wehle, Nussloch (DE)

(73) Assignee: DEERE & COMPANY, Moline, IL (US)

( * ) Notice: Subject to any disclaimer, the term of this patent is extended or adjusted under 35 U.S.C. 154(b) by 42 days.

(21) Appl. No.: 14/023,508

(22) Filed: Sep. 11, 2013

(65) Prior Publication Data

US 2015/0073618 A1    Mar. 12, 2015

(51) Int. Cl.
| | | |
|---|---|---|
| *G05D 1/00* | (2006.01) | |
| *B60W 50/00* | (2006.01) | |
| *A01B 71/00* | (2006.01) | |
| *B62D 53/00* | (2006.01) | |
| *B60R 25/02* | (2013.01) | |

(52) U.S. Cl.
CPC ............. *B60W 50/00* (2013.01); *A01B 71/00* (2013.01); *B62D 53/00* (2013.01); *B60R 25/02* (2013.01); *B60R 2325/308* (2013.01); *B60W 2050/0043* (2013.01)

(58) Field of Classification Search
CPC B60R 2325/308; B60R 25/02; B60R 25/042; B60R 25/08; B60W 50/00; B60W 2050/0043; B62D 53/00; A01B 71/00
USPC .......... 701/1, 29.2, 29.6, 29.8, 36, 30.3, 30.5; 340/438, 439
See application file for complete search history.

(56) References Cited

U.S. PATENT DOCUMENTS

| | | | | |
|---|---|---|---|---|
| 8,810,385 | B2 * | 8/2014 | McQuade et al. ............. | 340/439 |
| 2003/0061005 | A1 * | 3/2003 | Manegold et al. ............. | 702/182 |
| 2006/0025897 | A1 * | 2/2006 | Shostak et al. .................... | 701/1 |
| 2008/0161989 | A1 * | 7/2008 | Breed ............................ | 701/29 |

\* cited by examiner

*Primary Examiner* — Gertrude Arthur Jeanglaude

(57) ABSTRACT

An identification system is provided for a vehicle-implement system wherein a selected one of a plurality of different implements is coupled to the vehicle. Each of the plurality of implements has a unique corresponding component or actuator. A component sensor senses a condition of the component, such as the position of the piston of a hydraulic cylinder. The sensor generates a sensor signal which has a signal characteristic (such as a frequency) which has a plurality of values. each frequency value is unique to a corresponding one of the components. A signal processing unit receives the sensor signal and identifies the selected implement as a function of the value of the characteristic of the sensor signal.

7 Claims, 2 Drawing Sheets

AUTOMATIC IMPLEMENT IDENTIFICATION SYSTEM

FIELD OF THE INVENTION

The present disclosure relates to a control system which automatically identifies an implement or component which is connected to the control system.

BACKGROUND OF THE INVENTION

Various functions on implements mounted on tractors have been automated. For example, certain functions of a loader mounted on a tractor have been automated. Also, different implements, such as different sized loaders, may be mounted to the tractor, and each different implement may have a different particular actuator, such as a hydraulic cylinder. The different cylinders may have different aspects, such as valves, stroke, etc. The automation software must be adapted to these different aspects, or different versions of the automation software must be enabled for these different aspects. It is desired to have a system which automatically determines which, of a variety of implements or components, is to be controlled by the automation software.

SUMMARY

According to an aspect of the present disclosure, a control system automatically determines which, of a variety of implements or components, is to be controlled by automation software. Each implement or component includes a sensor which has an identifying signal characteristic which is uniquely related to the corresponding particular implement or component. The identifying signal characteristic may be the pulse width modulation (PWM) frequency of the sensor signal. When the control system is turned on, the control system detects the identifying signal characteristic and identifies the corresponding particular implement or component which is to be controlled. The automation software can then adjust or adapt itself, such as by loading the correct control tuning factors, to match the identified implement or component, based on the unique identifying signal characteristic transmitted by the sensor.

DETAILED DESCRIPTION OF THE DRAWINGS

Figure 1:
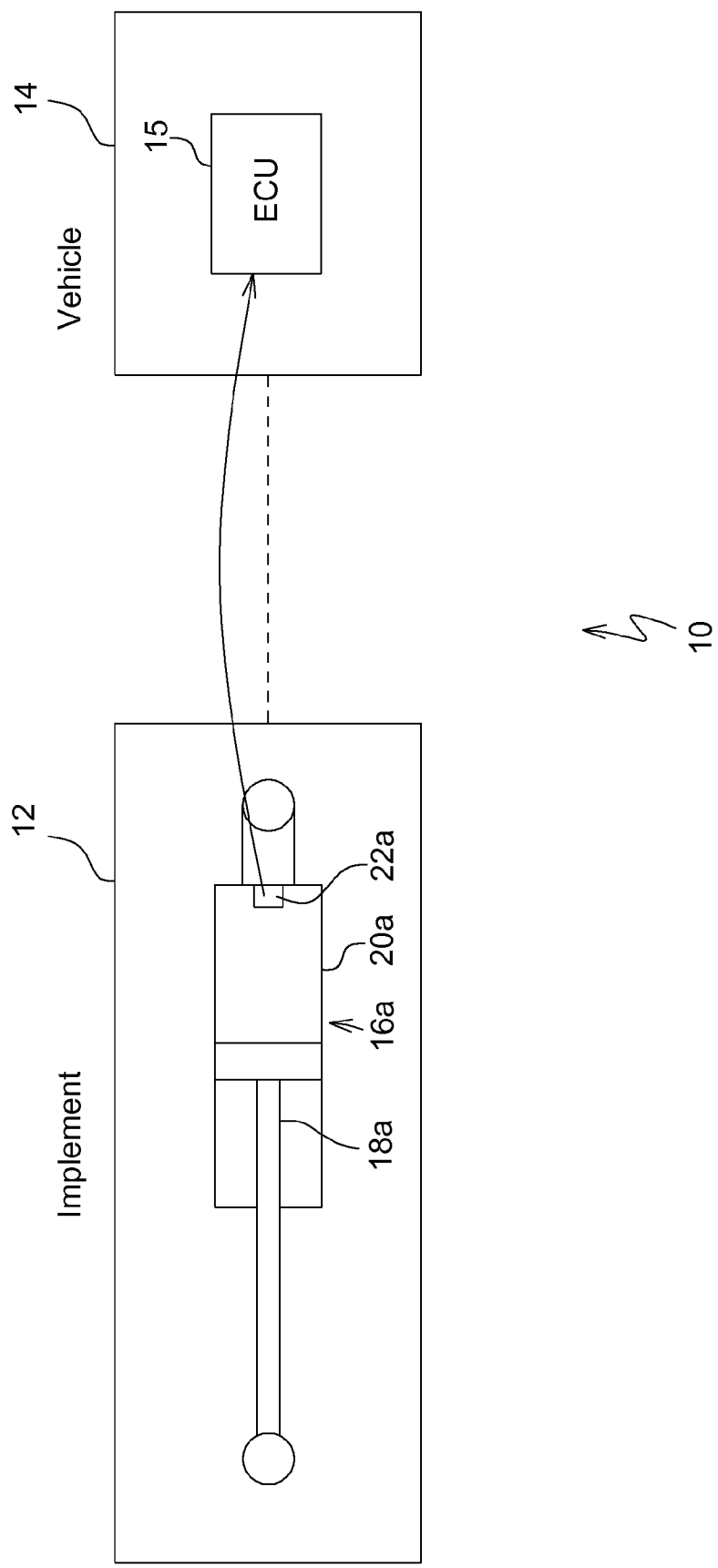
FIG. 1 is a simplified schematic view of an implement coupled to a vehicle.

Referring to FIG. 1, an implement-vehicle system 10 includes and implement 12, such as a loader, which is mounted to or coupled to the vehicle 14, such as a tractor. The implement 12 may be a selected one of a plurality of different sized implements (not shown). The selected implement 12 includes a corresponding actuator 16, such as a hydraulic cylinder. Such a hydraulic cylinder 16a includes a piston 18a which is slidable within a cylinder housing 20a, and a sensor 22a which senses a position of the piston 18a relative to the housing 20a. The vehicle 14 includes an electronic control unit (ECU) 15, although the ECU could be mounted on the implement 12. The ECU 15 is connected to the sensor 22a.

Figure 2:
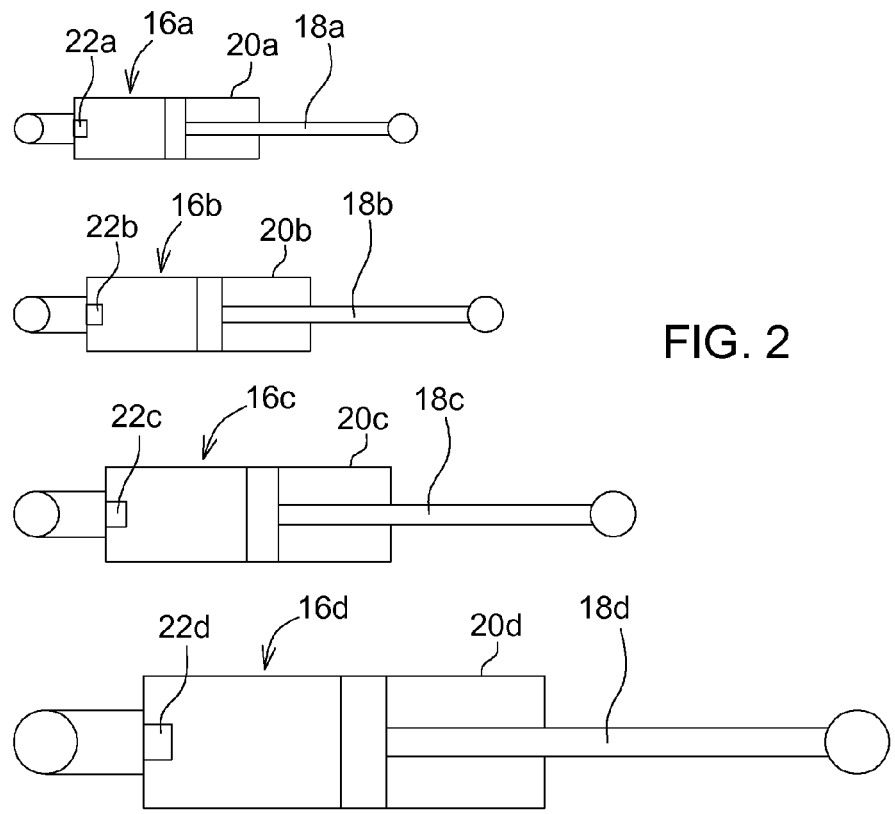
FIG. 2 is schematic view of a set of different sized hydraulic cylinders, one of which is mounted on the implement of FIG. 1.

Referring now to FIG. 2, the cylinder 16a may be selected from a plurality of cylinders 16a-16d, each of which has a different size, and each of which corresponds to a different size implement 12. Cylinder 16a has a sensor 22a which generates a sensor signal having an identifying characteristic or parameter. The sensor 22a preferably generates a pulse-width-modulated (PWM) output signal with a frequency having a first value, such as 350 Hz.

The PWM sensor signal has a frequency and duty cycle. Information is contained in the duty cycle of the sensor signal, such as a hydraulic flow rate. The signal frequency can be used to identify a device, component or implement to which the sensor is attached. By assigning a unique frequency to a particular device, component or implement, the frequency can be used to identify what device, component or implement has been connected to the tractor.

Cylinder 16b has a sensor 22b which preferably generates a sensor signal having a frequency with a second value such as 370 Hz. Cylinder 16c has a sensor 22c which preferably generates a sensor signal having frequency with a third value such as 380 Hz. Cylinder 16d has a sensor 22d which preferably generates a sensor signal having a frequency with a fourth value such as 370 Hz. Thus, each sensor 22a-22d has a frequency which corresponds to a different size of the cylinder 16a-16d in which it is mounted.

Figure 3:
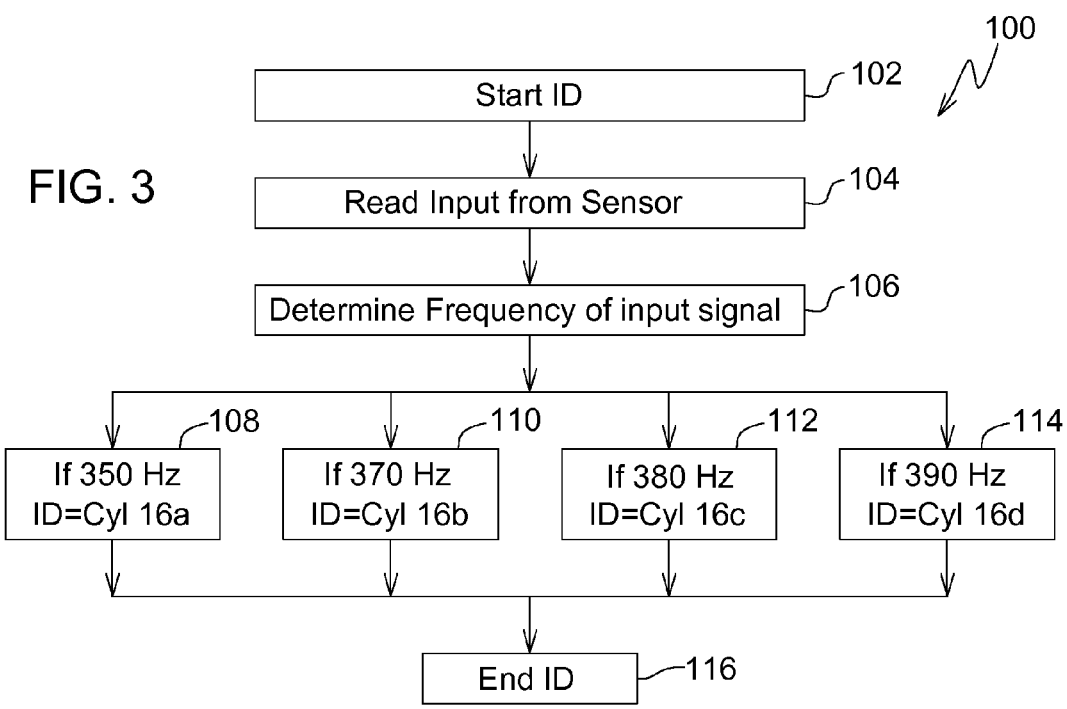
FIG. 3 is a flow chart of an algorithm performed by the ECU of FIG. 1.

The ECU 15 executes an algorithm 100 represented by FIG. 3. The algorithm 100 starts at step 102.

In step 104 the ECU 15 reads the signal from whichever one of sensors 16a-16d is connected to the ECU 15. Step 106 then determines the frequency of the signal from the connected sensor.

If the sensor frequency is a first value, such as 350 Hz, then step 108 determines that cylinder 16a is connected to the ECU 15.

If the sensor frequency is a second value, such as 370 Hz, then step 110 determines that cylinder 16b is connected to the ECU 15.

If the sensor frequency is a third value, such as 380 Hz, then step 112 determines that cylinder 16c is connected to the ECU 15.

If the sensor frequency is a fourth value, such as 390 Hz, then step 114 determines that cylinder 16d is connected to the ECU 15.

The identifying algorithm 100 ends at step 116.

Thus, by assigning a unique frequency to a sensor signal for a particular hydraulic cylinder, the frequency can be used to identify what particular cylinder has been connected to the tractor. If different components or implements have different sized cylinders mounted on then, this system can also determine or identify what component or implement is attached to the vehicle.

For example, different loaders have different hydraulic cylinders having different stroke lengths which are unique for each loader. The sensor for measuring stroke length can have a specific PWM frequency that is assigned to a specific loader. Therefore, the ECU 15 can detect the PWM frequency from the sensor on a loader and automatically load the correct operating parameters for the control software without manual intervention.

The conversion of the above flow chart into a standard language for implementing the algorithm described by the flow chart in a digital computer or microprocessor, will be evident to one with ordinary skill in the art.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected.

It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A component identification system for a vehicle-component system wherein a selected one of a plurality of different components is coupled to a vehicle, the component identification system comprising:
   a single sensor sensing a condition of the selected component, the single sensor generating a sensor signal, the sensor signal having a signal characteristic which has a unique value related to the selected component; and
   a signal processing unit receiving the sensor signal from the single sensor, the signal processing unit identifying the selected component as a function of the value;
   wherein:
   the plurality of components comprises a plurality of hydraulic cylinders, each of the cylinders having a different stroke length; and
   the signal characteristic has a plurality of different values, each value relating to a corresponding one of the different stroke lengths.

2. The component identification system of claim 1, wherein:
   the signal characteristic comprises a frequency of the sensor signal.

3. The component identification system of claim 1, wherein:
   the plurality of hydraulic cylinders include a piston which is movable within a housing; and
   the sensor senses a position of the piston relative to the housing.

4. A component identification system for a vehicle-implement system wherein a selected one of a plurality of different implements is coupled to the vehicle, each of the plurality of implements having a unique corresponding actuator, the component identification system comprising:
   an a single actuator sensor for sensing a condition of the corresponding actuator, the single sensor generating a sensor signal, the sensor signal having a signal characteristic having a value which is unique to the corresponding actuator; and
   a signal processing unit receiving the sensor signal from the sensor, the signal processing unit identifying the selected implement as a function of the value of the characteristic;
   wherein the sensor signal is a pulse-width-modulated signal have a frequency and a duty cycle.

5. The component identification system of claim 4, wherein:
   the actuator comprises a hydraulic cylinder mounted on an implement.

6. The component identification system of claim 5, wherein:
   the hydraulic cylinder comprises a piston movable in a housing; and
   the condition comprises a position of the piston relative to the housing.

7. A component identification system for a vehicle-implement system wherein a selected one of a plurality of different implements is coupled to the vehicle, each of the plurality of implements having a unique corresponding component, the component identification system comprising:
   a single component sensor for sensing a condition of the corresponding component, the single sensor generating a sensor signal, the sensor signal having a signal characteristic having a value which is unique to the component; and
   a signal processing unit receiving the sensor signal from the sensor, the signal processing unit identifying the selected implement as a function of the value of the characteristic;
   wherein:
   the plurality of components comprises a plurality of hydraulic cylinders, each of the cylinders having a different stroke length; and
   the signal characteristic has a plurality of different values, each value relating to a corresponding one of the different stroke lengths.

* * * * *